No. 625,405. Patented May 23, 1899.
O. J. MEACOCK & H. PENN.
SHEEP SHEARING MACHINE.
(Application filed Dec. 14, 1897.)
(No Model.)
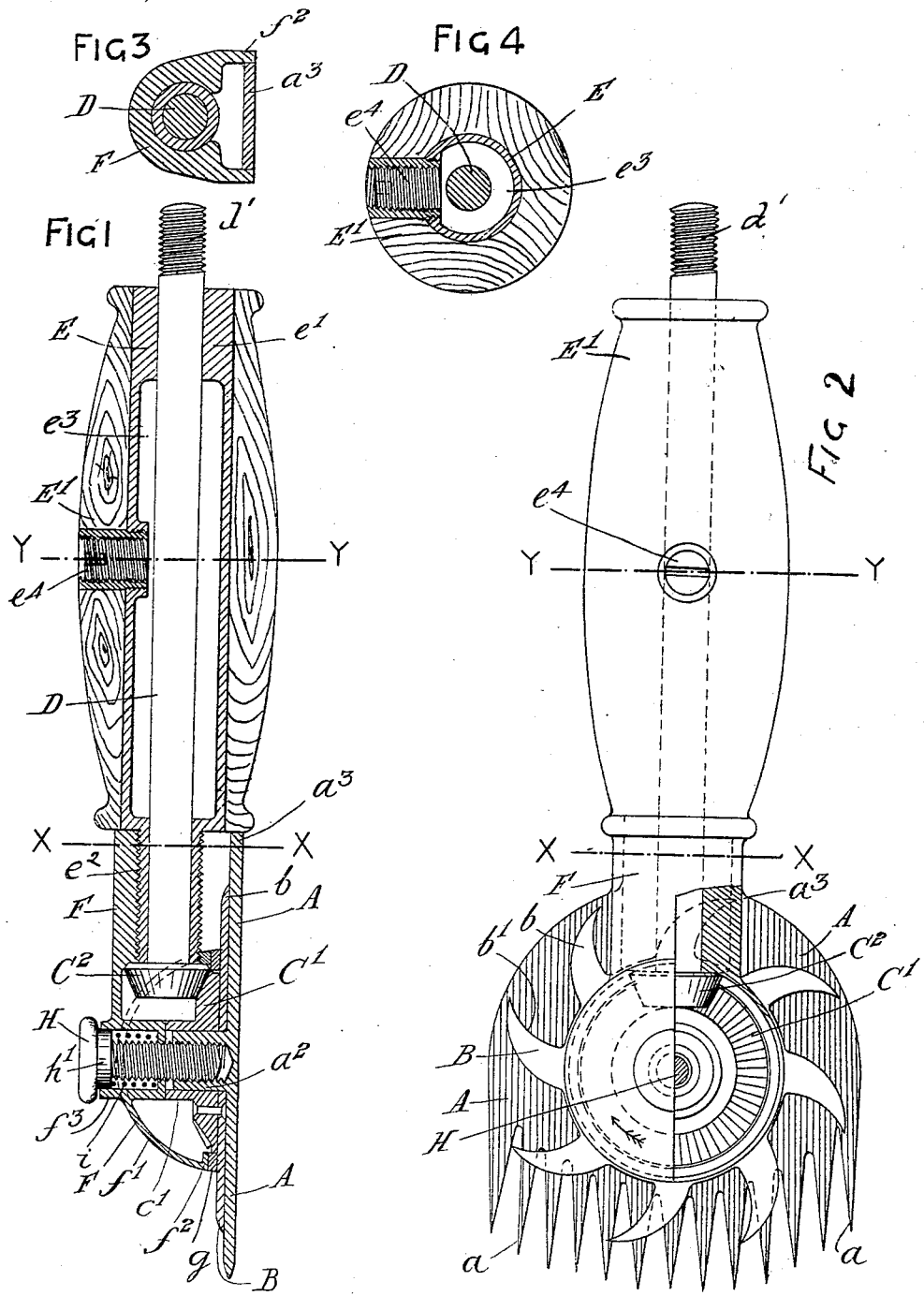

UNITED STATES PATENT OFFICE.

OWEN JONES MEACOCK AND HENRY PENN, OF BIRMINGHAM, ENGLAND.

SHEEP-SHEARING MACHINE.

SPECIFICATION forming part of Letters Patent No. 625,405, dated May 23, 1899.

Application filed December 14, 1897. Serial No. 661,821. (No model.)

*To all whom it may concern:*

Be it known that we, OWEN JONES MEACOCK and HENRY PENN, subjects of Her Majesty the Queen of Great Britain and Ireland, residing at Birmingham, in the county of Warwick, England, have invented certain new and useful Improvements in Sheep-Shearing Machines and the Like, of which the following is a specification.

This invention consists of the herein-described improvements in machines for shearing sheep and for other like purposes, such as for clipping horses and for cutting human hair.

In the accompanying drawings, Figure 1 is a longitudinal sectional elevation of our invention arranged as a rotary cutting-machine for shearing sheep and for other like purposes—such, for instance, as for clipping horses and for cutting human hair. Fig. 2 is a plan of the said machine. Fig. 3 is a cross-section of the same on line X X of Figs. 1 and 2, and Fig. 4 is a cross-section of the same on line Y Y of Figs. 1 and 2.

The same letters of reference indicate the same or corresponding parts in all the figures.

In the figures, A is the fixed partial disk or bottom plate, made with the projecting teeth at the front, which have cutting edges, and B is the rotary circular cutter, arranged to rotate on the top of the bottom plate A and made with projecting teeth $b$ at its periphery, each of these teeth having a cutting edge $b'$. The teeth $b$ of the rotary cutter B are curved in the direction in which the same rotate and do not project to the extremity of the teeth $a$, but are somewhat within the same, as shown. The rotary cutter B is made from a flat plate and has fixed centrally upon its upper surface the bevel-wheel $C'$, which gears with a bevel-pinion $C^2$, fixed on the motion-shaft D, which passes through bearings $e'$ $e^2$ in the handle E of the machine, and at its back end $d'$ is constructed in any suitable manner to connect to a flexible shaft or receive rotary motion from any other convenient source, so that when the shaft D revolves the rotary motion will be transmitted through the bevel-wheels $C'$ $C^2$ to the cutter B, which will revolve in the direction indicated by the arrow in Fig. 2. On the front part of the handle E there is screwed or otherwise fixed a metallic casing F, which is made hollow and at $f'$ is adapted to inclose and protect the bevel-wheels $C'$ $C^2$. This hollow part $f'$ of the casing F is circular when viewed in plan, and its lower edge $f^2$ is faced up and bears onto the felt or like washer $g$, which is fixed onto the top of the rotary cutter B. The bottom plate A is made with a central boss $a^2$, on which the rotary cutter B and beveled wheel $C'$ revolve. Fitting in this boss $a^2$ of the bottom plate A there is an adjusting-screw H, which takes into the boss $f^3$, formed in the casing F, and which is chambered out and contains a spiral or other spring $i$, which is compressed between the bottom of the chambered part of the boss $f^3$ and a shoulder $h'$ on the screw H, so that this spring $i$ insures a uniform pressure of the bottom plate A against the rotary cutter B, which pressure can be readily adjusted by turning the screw H. The upper part of the boss $c'$ of the beveled wheel $C'$ bears against the under side of the bottom $f^3$ of the casing F, so that the beveled wheels $C'$ $C^2$ will be properly in gear. The bottom plate A is made with a tang at $a^3$, which fits in a recess $f^2$, (see Fig. 3,) formed in the under side of the casing F, so as to prevent the bottom plate A from turning about the pin H. In order to insure efficient lubrication, the handle part E is made hollow at $e^3$, so as to form an oil-reservoir, which is closed as by the removable screwed stopper $c^4$, so that the oil from the chamber $e^3$ will lubricate the bearings $e'$ $e^2$ and passing through the bearings will lubricate the beveled wheels $C'$ $C^2$ and the bearings of the same, and the felt washer $g$ will effectually prevent the oil from flying about.

When the rotary cutter B is rotated by the turning of the shaft D and the machine is pushed forward into the wool or other like substance which is to be cut, the bottom teeth $a$ pass into the wool, which is sheared off between the cutting edges $b'$ of the teeth of the rotary cutter B and the cutting edges of the teeth $a$.

The handle E is provided with a suitable grip portion E'.

What we claim as our invention, and desire to secure by Letters Patent, is—

In combination, the bottom plate having projecting fingers, the rotary cutter, the beveled wheel C' secured thereon the casing F, the screw H passing through the casing and engaging the plate and the spring interposed between the casing and head of the screw and exerting pressure on the casing the hollow handle E having bearings $e'$ $e^2$, shaft D rotating thereon and having beveled pinion $C^2$ thereon and the felt washer interposed between the face of the casing and the rotating cutter, substantially as described.

In witness whereof we have hereunto set our hands in presence of two witnesses.

OWEN JONES MEACOCK.
HENRY PENN.

Witnesses:
CHARLES BOSWORTH KELLEY,
HERBERT WHITEHOUSE.